April 30, 1935. L. CLEMENS 1,999,282
WRAPPER PAD
Filed March 23, 1932
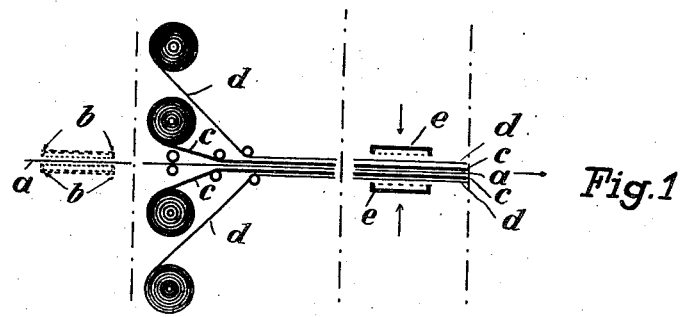
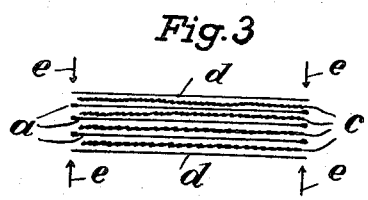
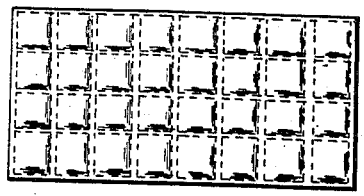

Patented Apr. 30, 1935

1,999,282

UNITED STATES PATENT OFFICE 1,999,282

WRAPPER PAD

Ludwig Clemens, Berlin, Germany

Application March 23, 1932, Serial No. 600,714
In Germany April 4, 1930

1 Claim. (Cl. 154—54)

This invention relates to a pad for protecting objects of all kinds that are sensitive to pressure, and to a method of producing the pad.

In order to protect goods that have to be shipped against damage various means have been proposed already, but most of these means were either too expensive or failed to give the desired protection. One of the main requirements of the packaging industry is the provision of low-priced yet effective insertions for the protection of goods, and the insertions hitherto in use consisted of covered cellulose wadding having the form of pad or cushion, the cover thereof having the form of an envelope of the type used for letters.

According to the invention, a pad is provided which can be produced at low cost and which surpasses existing means in resistance to crushing. This pad is composed of indented papers stamped in a spherical or wafer-like fashion and connected with the covering layers by having for instance their edges pressed together and pasted by means of a specially gummed and preferably smooth layer of paper, the various layers being united by pasting and embossing them in point-like or other fashion and causing the indented paper to become plane again at the points where paste was applied.

Indented papers could not be durably united till now to form pads, although this was highly desirable, since these papers possess all the qualities of cellulose wadding. They are at least just as resistant and pressure-proof as wadding and, furthermore, afford the considerable advantages of low cost of manufacture and low weight whereby the cost of transportation can be reduced also. The attempts hitherto made at uniting several layers of indented papers failed, since the various layers invariably and automatically became telescoped, so that the compressive strength of the layers was practically eliminated. In order to maintain the pressure-resisting properties of all layers, the invention employs intermediate layers of plane gummed paper, which are united with the indented layers by embossing; it being of course necessary to use paper permeable to adhesives as otherwise the union cannot be effected.

By way of example, the invention is illustrated in the accompanying drawing, in which Figure 1 is a diagram of the working process; Fig. 2 shows the stamping step immediately after the union of the layers; Fig. 3 shows the individual layers of one embodiment prior to being united; and Fig. 4 is a view of the finished pad.

Referring to the drawing, a plane web $a$ is gummed according to the type of pad desired, the glue or paste being applied by means of the swabs $b$. Then the indented filler webs $c$ consisting preferably of permeable, soft and unsized paper, and the covering webs $d$ are led from both sides towards the web $a$ and superposed thereon. The next step is to apply heated dies $e$ from above and below to the superposed layers, the dies having a form similar to that of the glue supplying means or swabs $b$. The application of the hot dies causes the glue to pass through the porous material and to connect the various webs in a durable manner. The size and form of the pads may be chosen at will, and it is further possible to employ several layers of filling material, which are then pressed together and which may consist of wadding with covering layers. The covering layers may be composed of papers of the same kind and of the same or different colors, patterns and the like. The top side of the pad may be covered with fancy paper and the side facing the goods with a suitable plane paper. The front side and/or the rear side may be printed, embossed or treated in any other manner, and the paper covering may be replaced by a textile fabric, such as silk or the like. A pad produced in the manner described is equal in effect to a sewn cushion.

I claim:—

A laminated pad consisting of alternate layers of plane and indented paper superposed upon each other and secured together by discontinuous areas of adhesive, the laminated pad being embossed at points corresponding to said adhesive areas.

LUDWIG CLEMENS.